July 21, 1970  R. STEINER  3,521,314

TORQUE LIMITING TOOL HOLDER

Filed Sept. 19, 1967

INVENTOR
RUDOLPH STEINER

BY

ATTORNEY 3,521,314
TORQUE LIMITING TOOL HOLDER
Rudolph Steiner, Rochester, N.Y., assignor to Numertap, Inc., Rochester, N.Y., a corporation of New York
Filed Sept. 19, 1967, Ser. No. 668,853
Int. Cl. B23g 5/14, 5/16
U.S. Cl. 10—135                                            11 Claims

ABSTRACT OF THE DISCLOSURE

The holder has a shank to be driven by a machine spindle, an axially reciprocable sleeve on the shank, and an adapter releasably coupled at one end of the sleeve, and adapted to carry a tool in its opposite end. When the tool binds, spring-loaded ball couplers carried by the sleeve are forced radially out of cooperating recesses in the adapter to interrupt the drive thereto. The balls are unevenly spaced around the adapter so that after interruption of the drive, it requires at least one revolution of the sleeve before the coupling is reengaged. A locking ring can be rotated to fix the shank and sleeve axially to one another during drilling or reaming operations.

---

This invention relates to tool holders, and more particularly to an improved holder for limiting the maximum torque which can be transmitted to a tool such as a drill, tap, or reamer by the spindle of a drill press or similar machine.

Heretofore it has been the practice in holders of the type described to incorporate a releasable coupling, which disconnects the drive from the machine spindle to the tool, whenever the torque that is applied to the tool exceeds a predetermined value. Prior such holders have either been constructed to release the drive whenever a certain predetermined torque has been exceeded, or have required adjustment for different types of tools, as to the amount of torque that can be transmitted. A major disadvantage of the latter type of construction is that the torque-limiting coupling must be adjusted manually by an operator to compensate for the change in size or type of the tool; the maximum torque transmittable by the holder being increased for a larger tool, and decreased for a smaller tool. Even so, unless the operator uses a gauge in making the adjustment or unless the holder is graduated very precisely, there can be no assurance that the holder is properly adjusted to suit the new tool.

It is an object of this invention to provide an improved tool holder, which will obviate the need for making manual adjustments in the holder to compensate for changes in tool sizes or types.

A further object of this invention is to provide an improved holder of the type described, which is substantially less expensive and easy to operate than prior such holders.

An additional object of this invention is to provide a tool holder for holding taps having a "floating connection" between the machine spindle and tap, so that the tap may lead itself into the work.

A further object of the invention is to provide a tool holder with a "floating connection" between tool spindle and holder that can be disconnected when it is desired to use the holder for holding other tools such as drills and reamers.

It is also an object of this invention to minimize the undesirable noise and vibration that usually occurs in tool holders of the type described, when their maximum allowable torques are exceeded.

Other objects of the invention will be apparent hereinafter from the specification, and from the recital of the appended claims, particularly when read in conjuntcion with the accompanying drawing.

Figure 1:
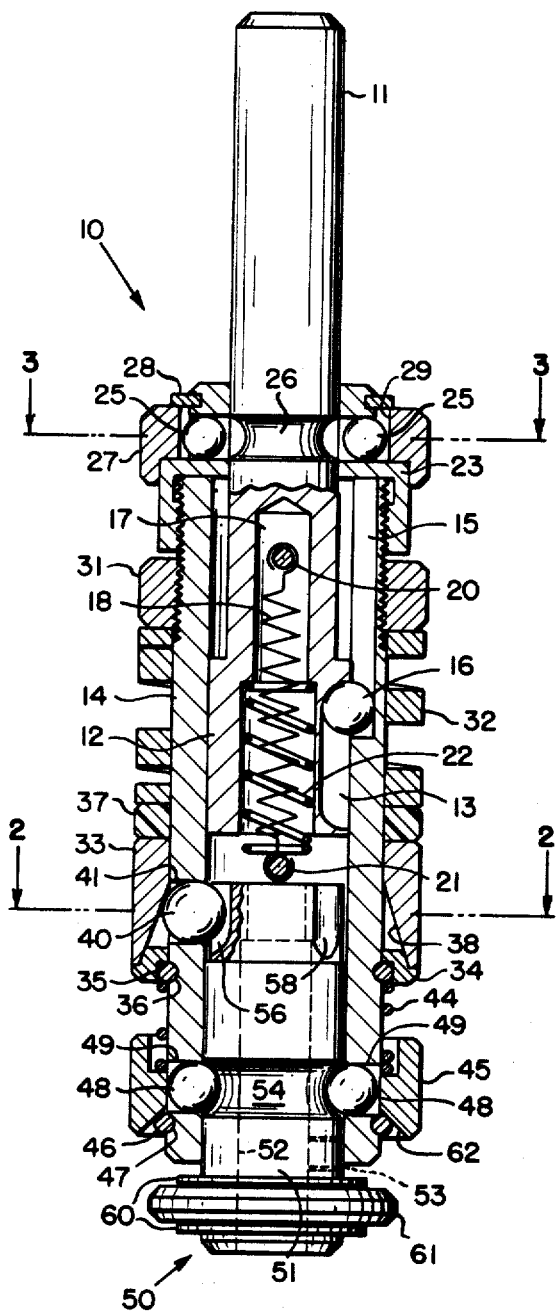
FIG. 1 is a generally axial sectional view of a tool holder made in accordance with one embodiment of this invention, parts, however, being shown in full and other parts being broken away.

Referring now to the drawing by numerals of reference, 10 denotes the tool holder generally. 11 denotes the drive or shank portion of this holder, the upper end of which is adapted to be removably chucked in the spindle of a drill press, or like machine, for rotation thereby. At its lower end the shank 11 is of enlarged diameter as denoted at 12, and has in this enlarged portion at least one axially extending groove 13. Mounted for axial sliding movement on shank 11 coaxially thereof is a sleeve 14, which is provided internally with an axially extending groove 15 that extends downwardly from the upper end of the sleeve 14 for part only of the axial length of the sleeve. The shank 11 is rotatably coupled to the sleeve 14 by a ball 16, which is housed partly in the groove 13 and partly in the groove 15.

Mounted in a bore 17 formed in the lower end of shank 11 coaxially thereof is a tension spring 18, the upper end of which is secured to a pin 20 that extends transversely across the upper end of bore 17, and is secured at its lower end to a further pin 21 that extends transversely across sleeve 14 beneath the lower end of shank 11. This spring 18 resists movement of sleeve 14 downwardly on shank 11, but is counteracted slightly by a compression spring 22, which surrounds the lower end of spring 18. Spring 22 seats at one end on the bottom of a counterbore formed in the lower end of bore 17; and at its opposite end seats on pin 21.

Figure 3:
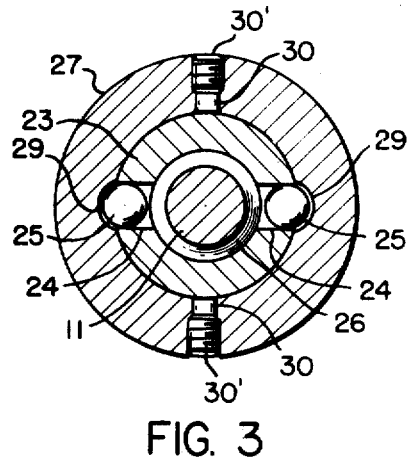
FIG. 3 is a sectional view taken on line 3—3 in FIG. 1 looking in the direction of the arrows.

The upper end of shank 11 passes slidably through the bore in an annular cap 23 that is secured over the upper end of sleeve 14 coaxially thereof. Cap 23 has a reduced diameter upper end containing a pair of diametrrally opposed radial openings 24, which house a pair of radially movable ball detents 25, that normally register with an annular groove 26 in the shank 11. A ring 27 is mounted on the upper end of cap 23 for rotation coaxially thereof beneath the peripheral edge of a spring clamp 28, that is secured in an annular recess in the upper end of cap 23 to hold the ring 27 against axial movement on the cap. The balls 25 are held in the openings 24 by ring 27, which has on its inside a pair of diametrically opposed recesses 29 that permit the balls 25 to move radially outwardly from engagement with groove 26, when the ring 27 is in the position shown in FIGS. 1 and 3. Ring 27 may be rotated manually slightly on cap 23 to shift recesses 29 out of registry with balls 25, in which case the latter are forced by the inner peripheral surface of ring 27 into locking engagement with groove 26 to prevent axial movement between shank 11 and sleeve 14. A pair of nylon pads 30 are mounted in diametrically opposed radial apertures in ring 27, and are urged into frictional engagement with the cap 23 by set screws 30' to frictionally resist rotation of ring 27.

Adjustably threaded onto the outside of the sleeve 14 beneath the cap 23 is a nut 31. Surrounding sleeve 14 beneath nut 21 is a coiled compression spring 32, the upper end of which engages the underside of the nut 31, and the lower end of which engages a Teflon ring 37, that seats on the upper end of a ring 33. Ring 33 surrounds, and is axially slidable on, the sleeve 14 beneath the spring 32.

At its lower end ring 33 engages a stop ring 34, which has a recessed lower end that seats on a retaining ring 35, which is secured in and projects radially from an annular groove 36 that is formed in the outside of the sleeve 14 above its lower end. The nut 31 is adjustable manually to vary the tension in the spring 32, and hence the force with which this spring urges the ring 33 axially downwardly on the sleeve 14 and against the stop ring 34.

In its lower portion ring 33 has a conical bore 38. Bore 38 engages three steel balls 40 housed in openings 41, 42 and 43 formed in the sleeve 14. The openings 41, 42 and 43 are purposefully not equally angularly spaced from one another about sleeve 14. Also, the inner ends thereof are slightly restricted to limit the extent to which balls 40 may enter the bore of the sleeve.

Surrounding the sleeve 14 beneath the stop ring 34 is a further, coiled compression spring 44, the upper end of which engages the retaining ring 35, and the lower end of which is seated against a quick release ring 45, which is axially slidable on the sleeve 14. A further retaining ring 46 is seated in an annular recess 47 formed in the sleeve 14 just above its lower end, and is engageable with the underside of the quick-release ring 45 to limit its downward movement on the sleeve 14 under the influence of the spring 44.

This spring 44 normally holds the ring 45 in its lowermost position, as illustrated in FIG. 1, wherein its inner peripheral surface engages a pair of detents or balls 48 that are mounted for limited radial movement in openings 49 formed in diametrically opposite sides of the sleeve 14 just above the recess 47. The ring 45 thus normally holds the balls 48 in a clamping position in which they project into the bore of the sleeve 14, releasably to secure in the lower end of the sleeve 14 any one of a number of different tool adapters 50.

Each tool adapter 50, only one of which is illustrated in the drawing, comprises a body portion 51, having an axial bore 52, and a set-screw 53 adjustable radially in the body portion to secure the shank end of a drill, tap, or like tool (not illustrated), in the adapter. Intermediate its ends the body 51 has in its peripheral surface a circumferential groove 54, which registers with, and is engageable by, the ball detents 48, when the holder 50 is fully seated in the lower end of sleeve 14. In its upper end each adapter 50 is provided with three unequally angularly spaced arcuate recesses or grooves 56, 57 and 58, which extend from the upper end of the adapter downwardly a distance approximately equal to the diameter of a ball 40. When the adapter 50 is inserted into sleeve 14, these recesses 56, 57 and 58 receive portions of the balls 40 to connect the adapter to the sleeve 14.

Rotatably mounted on the lower end of each adapter 50 between a pair of axially spaced shoulders or ring flanges 60, that are formed in the body portion 51 of the adapter, is an adapter handling ring 61.

In use, the shank 11 is secured in the spindle of a drill press or the like; quick-release ring 45 is shifted axially upwardly against the resistance of the spring 44 until a conical surface 62 in the lower end of the ring bore registers with the detents 48 to permit the latter to shift radially outwardly. At this time an adapter 50, which has a tool, for instance a tap or a drill, secured therein by the set-screw 53, may be inserted into the lower end of the sleeve 14 until its groove 54 registers with the detents 48. When the ring 45 is released the balls 48 will be forced radially inwardly to lock the adapter in the tool holder by engaging the groove 54 in the adapter.

At this time the ring 27 is rotated slightly to lock balls 25 in recess 26 in the shank 10, if the "floating" effect of the tool is not wanted—as, for example, when the tool is a drill or reamer. If, however, the tool is a tap, the ring 27 is left in the position shown in FIG. 3.

Also at this time, the ring 33 is in its lowermost position, and the balls 40 are thus held resiliently in engagement with the recesses 56, 57 and 58 in the upper end of the adapter, so that the rotation of the shank 11 will be transmitted by the ball 16 to the sleeve 14, and in turn, by the balls 40 to the adapter 50.

Assuming, for example, that a tap is secured in the adapter 50, the machine spindle (not illustrated) may be lowered to engage the tap with the hole in the piece of work that is to be threaded. The rotating tap begins to thread into the work without any further lowering of the machine spindle. This occurs because the adapter 50, and hence the sleeve 14, are drawn as a unit downwardly on the shank 11 against the resistance of the spring 18 by the tap as it threads into the work.

When the tap bottoms, or the maximum torque as determined by the spring 32 is exceeded, the rotating sleeve 14 will cause the balls 40 to be urged out of the recesses 56, 57 and 58, and the balls will, in turn, be forced radially outwardly against the conical surface 38 with sufficient force to cause the ring 33 to be shifted upwardly against the resistance of spring 32, thus disconnecting the drive between sleeve 14 and adapter 50. The shank 11 and sleeve 14 continue to rotate, but the adapter 50 and the tool are no longer driven. When the drive to the adapter 50 is thus disconnected, the sleeve 14 must revolve at least once before the unevenly spaced balls 40 reenter the recesses 56, 57 and 58, and as a result, the couplings tends to reengage the drive to the adapter 50 at this time.

The notched or recessed upper end of the adapter 50 thus functions as a camming device for interrupting the drive between the sleeve 14 and the adapter 50, when the maximum allowable torque for the tool then in the adapter (i.e., the torque, which, if exceeded, would cause the tool to fail) is exceeded.

Figure 2:
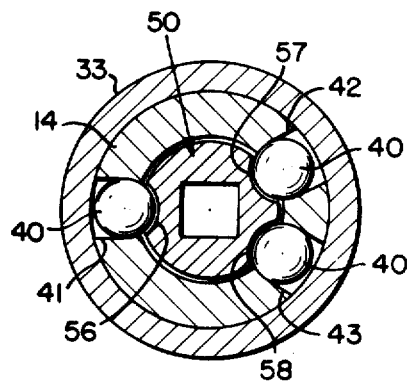
FIG. 2 is a sectional view taken on line 2—2 in FIG. 1 looking in the direction of the arrows.

Although the nut 31 may be adjusted to alter the tension in the spring 32, and hence the maximum allowable torque that can be transmitted by the balls 40 to that adapter 50 illustrated in FIGS. 1 and 2; it will likewise be apparent that without adjusting the nut 31, the maximum torque transmittable by the balls 40 to adapter 50 can be altered by reducing the diameter of the upper end of the adapter. By reducing the diameter of the upper end of the adapter, the radial depth of the grooves 56, 57, 58 is decreased, and the effort required to dislodge a respective ball therefrom is reduced, thereby reducing the maximum torque that is transmittable by the balls 40.

Each tool may therefore be provided with its own adapter 50, which, depending upon the diameter of its upper end, will automatically set or determine the maximum allowable torque that can be transmitted by the balls 40, when the adapter is inserted in the sleeve 14. The nut 21 may be used, of course, for coarse adjustments of the maximum allowable torque.

It will be apparent than that the instant invention provides a novel tool holder having compact and relatively inexpensive means for releasably coupling a tool, such as a tap, drill, reamer, etc., to the spindle of a drill press, or the like. This coupling means, moreover, includes a novel adapter 50 for automatically setting the maximum allowable torque that can be transmitted to a tool, thereby eliminating any excessive strain on the tool when it binds or bottoms out in a workpiece. This maximum torque is proportional to the diameter of the upper end of an adapter 50 so that a predetermined maximum torque can be set by proper selection of the adapter. Also, the rotatable ring 61 on the bottom of each adapter permits it to be exchanged while it is still in motion—i.e., still rotating. When the ring 45 is urged upwardly to release the detents 48, the adapter 50 will drop out, or can be pulled out of the lower end of the sleeve 14 with little or no effort.

Another advantage of the novel holder disclosed herein is that if it is desired to use the holder for drilling or reaming, the ring 27 may be rotated slightly to lock shank 11 and sleeve 14 against axial movement relative to one another. When, however, the ring 27 is in its unlocked position, spring 22 normally urges sleeve 14 slightly downwardly on shank 11 against the resistance of spring 18 so that ball 16 is not fully seated against the upper end of groove 13. This permits a slight vertical play between the tool and shank 11. In addition to being unequally spaced angularly about the holder axis, the balls 40 move radially, rather than vertically, when the maximum torque is exceeded, thereby minimizing even further the vibrations which might otherwise be transmitted to a machine spindle during the rotation of sleeve 14 and its balls 40 relative to adapter 50.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A rotary tool holder, comprising
   a rotary driving member,
   a driven member,
   means connecting said members for limited axial movement relative to each other, and for transmitting the rotation of said driving member to said driven member,
   a third member for holding a tool,
   means for releasably coupling said third member to said driven member for rotation thereby about a common axis, including a uplurality of coupling members mounted in one of the two releasably coupled parts for limited movement radially of said axis, and engageable in a plurality of cooperating recesses in the other of said two releasably coupled parts,
   resilient means resisting radial movement of said coupling members and normally holding said coupling members engaged in said recesses,
   means on said other part for camming said coupling members out of said recesses, when the torque transmitted from said driven member to said third member exceeds a predeterined aount, thereby to allow rotation of said driven member relative to said third member, and
   means for releasably securing said driven member and said third member against axial movement relative to one another.

2. A rotary tool holder as defined in claim 1, wherein said recesses are nonuniformly spaced about said axis so that said coupling members reengage said recesses only once per revolution of said driven member.

3. A rotary tool holder as defined in claim 1, wherein said recesses are of nonuniform depth and constitute said camming means.

4. A rotary tool holder as defined in claim 1, wherein
said driving member has a cylindrical shank having an axial groove in its periphery,
said driven member comprises a sleeve surrounding said shank, and having in its bore an axial groove which confronts the groove in said shank,
said rotation transmitting means comprises a ball seated in both said grooves, and
a detent is fixed against axial movement on said sleeve, and is movable radially into and out of locking position in which it projects into a recess in said shank releasably to secure said driving and driven members against axial movement relative to one another.

5. A rotary tool holder as defined in claim 1, wherein
said driven member has an axial bore into which one end of said third member is insertable a predetermined distance,
said coupling members are mounted in said driven member normally to project into said bore, and
said recesses are formed in the peripheral surface of said third member adjacent said one end thereof, so that when said third member is inserted into said bore said coupling members seat in said recesses.

6. A rotary tool holder as defined in claim 5, wherein
three of said recesses are formed in said third member at angularly spaced points around said one end thereof, and
one of said three recesses is spaced angularly from the other two recesses a distance substantially greater than the distance separating said other two recesses.

7. A rotary tool holder as defined in claim 5, wherein
said driven member is a sleeve,
said coupling members are movably mounted in a first plurality of radial holes in said sleeve,
said resilient means comprises a spring-loaded ring axially slidable on said sleeve, and having an internal conical surface engaging said coupling members resiliently to hold them seated in said recesses, and
said third member has a cylindrical peripheral surface on said one end thereof, and said recesses decrease in depth away from said one end and force said coupling members radially outwardly against said conical surface with sufficient force to shift said ring in a direction to release said coupling members from said recesses, when said torque exceeds said predetermined amount.

8. A rotary tool as defined in claim 7, wherein said means for securing said driven and third members against axial movement relative to one another, comprises
a plurality of balls movably mounted in a second plurality of radial holes in said sleeve,
a second ring axially slidable on said sleeve and having a conical bore portion at one end, said second ring being movable between a first position in which said second ring engages said balls to hold them seated in a circumferential groove in said third member, and a second position in which said conical bore portion permits said balls to shift radially out of engagement with said groove, and
a spring is engaged with said second ring resiliently to hold it in said first position.

9. A rotary tool as defined in claim 1, wherein
said driving member is a shaft, which is adapted to be secured to the spindle of a machine,
said driven member is a sleeve axially slidable on said shaft between first and second limit positions,
said third member has a cylindrical upper end insertable into the lower end of said sleeve coaxially thereof,
said third member has an axial bore in which a tool is adapted to be secured,
said coupling members comprise a plurality of balls, which are mounted in radial holes in said sleeve to project into the axail bore of said sleeve, and
said recesses are formed in said third member, and open on said upper end thereof to receive the portions of said balls which project into said bore of said sleeve, when said cylindrical end is inserted into said sleeve.

10. A rotary tool as defined in claim 9, including
a tension spring secured at opposite ends there to said shaft and said sleeve, respectively, to resist axial movement of said sleeve downwardly on said shaft, and normally urging said sleeve to one of its limit positions, and
a compression spring interposed between said shaft and sleeve to oppose said tension spring and operative normally to hold said sleeve resiliently between its limit positions.

11. A rotary tool as defined in claim 9 wherein
each of said balls has a diameter larger than the thickness of the annular wall of said sleeve so that said balls normally project beyond both the inner and outer peripheral surfaces of said sleeve, said resilient means comprises a movable ring surrounding said sleeve coaxially thereof, and having a conical bore wall in one end thereof, a spring resists axial movement of said ring on said sleeve, and normally urges said ring into a position in which said conical surface engages said balls to urge them radially inwardly and resiliently into said recesses in said third member, and the cylindrical upper end of said third member is operative, when said predetermined torque is exceeded, to urge said balls radially outwardly against said conical surface with sufficient force to cause said ring to be shifted axially against said spring, whereby said balls can move radially outwardly from the recesses in said third member.

References Cited

UNITED STATES PATENTS

| | | | |
|---|---|---|---|
| 2,540,513 | 2/1951 | Dodd | 10—135 |
| 2,791,433 | 5/1957 | Dodd | 10—135 |
| 1,898,726 | 2/1933 | Hess | 10—135 |
| 2,940,571 | 6/1960 | Bernard | 10—135 |
| 3,032,156 | 5/1962 | Eriksson | 10—135 |
| 3,325,837 | 6/1967 | Hartmann | 10—135 |

FOREIGN PATENTS

| | | |
|---|---|---|
| 127,462 | 2/1950 | Sweden. |
| 180,046 | 7/1962 | Sweden. |
| 609,973 | 10/1948 | Great Britain. |
| 961,825 | 6/1964 | Great Britain. |

CHARLES W. LANHAM, Primary Examiner

E. M. COMBS, Assistant Examiner

U.S. Cl. X.R.

10—141